Figure 1:
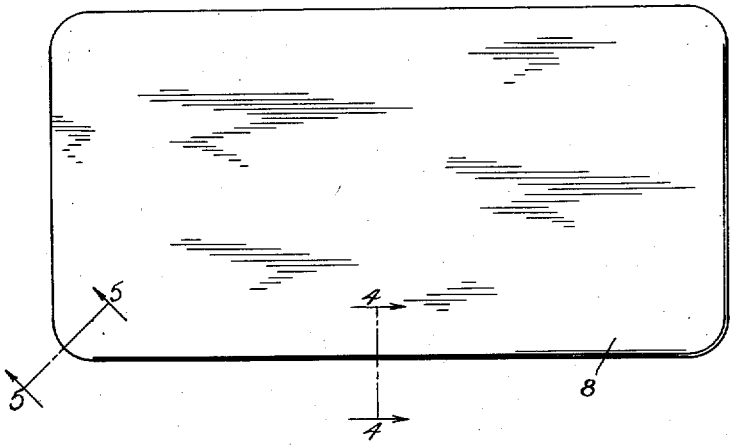

June 24, 1930. C. A. HUPP Re. 17,714

TABLE COVER

Original Filed May 26, 1928

INVENTOR,
Charles A. Hupp,
By
Minturn & Minturn,
Attorneys.

Reissued June 24, 1930 Re. 17,714

UNITED STATES PATENT OFFICE

CHARLES A. HUPP, OF INDIANAPOLIS, INDIANA, ASSIGNOR OF ONE-HALF TO WAKEFIELD M. WILT, OF SYRACUSE, INDIANA

TABLE COVER

Original No. 1,744,769, dated January 28, 1930, Serial No. 280,845, filed May 26, 1928. Application for reissue filed April 10, 1930. Serial No. 443,205.

The present invention relates to a table cover and has for its prime object to provide a cover of rubber or equivalent material which is placed over the table top and has means for fastening the same under the top in a reinforcing manner.

Another very important object of the invention resides in the provision of a table top of this nature which is simple in its construction, inexpensive to manufacture, strong and durable, thoroughly efficient and reliable in use, and otherwise well adapted to the purpose for which it is designed.

With the above and numerous other objects in view as will appear as the description proceeds, the invention resides in certain novel details of construction, and in the combination and arrangement of parts, as will be hereinafter more fully described and claimed.

Figure 2:
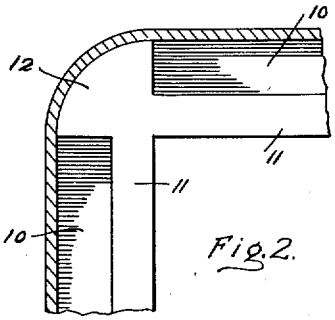
Figure 3:
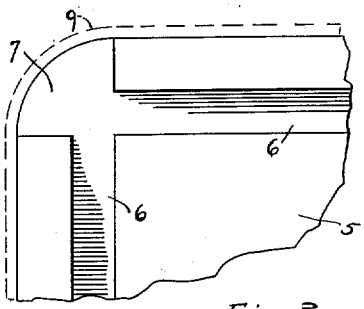
Figure 4:
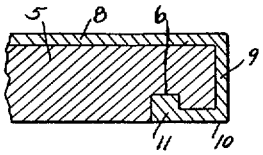
Figure 5:
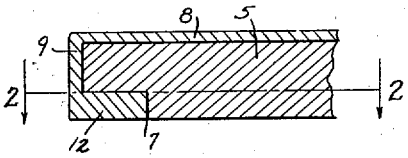

In the drawing:

Figure 1 is a top plan view of the table top embodying the features of my invention, Figure 2 is a sectional view through the cover taken horizontally at one corner substantially on the line 2—2 of Figure 5, the top being removed, Figure 3 is a bottom plan view of one corner of the table top, Figure 4 is a detail section taken substantially on the line 4—4 of Figure 1, and Figure 5 is a detail section taken substantially on the line 5—5 of Figure 1.

Referring to the drawing in detail it will be seen that the numeral 5 denotes a table cover which may be rectangular, oval or round, but which, in the present instance, by way of example, is rectangular. The under surface of this table top is provided with channels 6 extending along the edges thereof slightly spaced inwardly therefrom and at the corners these channels merge into recesses 7.

The cover is formed from a sheet of rubber or equivalent material having a body 8 to fit over the top of the table top 5 and having a skirt 9 depending downwardly therefrom over the edges of the table and merging into an inwardly directed bottom flange 10 which has an upwardly extending bead or rib 11 to fit in the channels 6.

The beads or ribs at the corner merge into substantially triangular shaped thickened portions or lugs 12 to fill the recesses 7. The lugs 12 form means for uniting the ribs with the skirts at the corners of the cover and form reinforcing means for the same. The rubber top is either cemented to the old surface or to the new top or it may be just cemented at the edges or underneath in the channel where it fits as has been just explained, or vulcanized to the surface or held by the tension of the rubber only and when held by the tension of the rubber only, the fit of the ribs 11 in the channels 6, is a driving or force-fit which compresses the rubber in the channels and the elasticity of the rubber causes it to expand and grip the walls of the channels, thereby preventing the withdrawal of the ribs from the channels, upon the cessation of the seating force.

It is thought that the construction, utility and advantages of the invention will now be apparent to those skilled in this art without a more detail description thereof. It is apparent that the changes in the details of construction may be resorted to without departing from the spirit or scope of the invention as hereinafter claimed or sacrificing any of its advantages.

Having thus described my invention, what I claim as new is:

1. In combination, a table top comprising a body having channels and a rubber cover for said top having molded beads which are compressed in the channels.

2. In combination, a table top comprising a body having its under surface provided with channels, a molded rubber table top comprising a top plate, a depending skirt formed on the margin of the top plate, inwardly directed flat flanges formed on the skirt engaging the lower face of the table top body, and upwardly directing holding ribs on said flanges compressed in the channels.

3. In combination, a table top comprising a body having the under surface thereof provided with channels near the edges thereof and spaced inwardly from said edges, a cover for said top comprising a body of rubber fitted over the top and having depending marginal flanges merging into inwardly directed flanges having beads compressed in the channels.

4. As a new article of manufacture, a molded rubber table top cover comprising a top plate, a depending skirt formed on the margin of the top plate, inwardly directed flat flanges on the skirt, upwardly directed holding ribs on the flanges, and substantially triangular shaped lugs connecting the ribs and the skirt at the corners of the table top cover.

5. In combination, a conventional table top having its lower face provided with channels in spaced parallel relation to the margin thereof and substantially triangular shaped recesses communicating with the channels at the corners of the top, and a molded rubber table top cover comprising a top plate for engaging the top face of the table top, a depending skirt formed on the margin of the table top plate for engaging the marginal edges of the table top, inwardly directed flat flanges formed on the skirt for engaging the lower face of the table top, upwardly directed holding ribs formed on said flanges for engaging in said channels, and a substantially triangular shaped lug connecting the ribs and the skirt at each corner of the table top cover for engaging in said substantially triangular shaped recesses.

In testimony whereof I affix my signature.

CHARLES A. HUPP.